United States Patent Office 2,862,957
Patented Dec. 2, 1958

2,862,957
METHOD OF MANUFACTURING ALKYL, HYDROXYALKYL ESTERS OF TEREPHTHALIC ACID

Erhard Siggel, Laudenbach (Main), and Karl Macura, Obernburg (Main), Germany, assignors to Vereinigte Glanzstoff-Fabriken A. G., Wuppertal-Elberfeld, Germany, a corporation of Germany No Drawing. Application August 2, 1954
Serial No. 447,382

Claims priority, application Germany August 3, 1953

9 Claims. (Cl. 260—475)

This invention relates to the manufacture of terephthalic acid esters. More particularly it is directed to esters of terephthalic acid wherein a polyhydric alcohol such as glycol constitutes one of the esterifying components and a monohydric alcohol such as methanol or ethanol constitutes the other esterifying component.

It is known that alkaline salts of the monoesters of terephthalic alcohols can be reacted with chlorohydrins such as ethylene chlorohydrin (2-chloro-ethanol) until the desired ester with the two different esterifying alcoholic components is formed. In such a reaction the separation of non-organic salts impedes the completion of the esterification. It is also very difficult, under such circumstances, completely to purify the mixed ester thus produced.

It is further known that diacarboxylic acids can be reacted with ethylene oxide. Such a reaction results in a formation of the diglycol esters of the dicarboxylic acid or the condensation products thereof. However, although the monoglycol esters of dicarboxylic acids are technically valuable for the manufacture of high molecular condensation products, the monoglycol ester of terephthalic acid particularly is extremely difficult to obtain. When terephthalic acid is reacted with ethylene oxide in the presence of water the principal course of the reaction is the formation of the diglycol ester. In addition, a small quantity of the monoglycol ester of terephthalic acid is formed, the so-called mono-beta-hydroxyethyl terephthalate. However, this method does not constitute a practical process for the manufacture of large quantities of this product, since it, the monoester, is obtained only as a by-product and can be separated from the principal product only with great difficulty.

In addition to the mono-glycol ester of terephthalic acid, products which are particularly valuable for condensation reactions are, derivatives thereof in the form of esters formed from low boiling points alcohols. When such derivatives undergo condensation an alcohol is split off, as for example methyl alcohol, rather than water.

It has been found that the desired mixed ester can be obtained in good yield and of high purity by a simple reaction when monomethyl terephthalate, dissolved in an inert solvent, is reacted with ethylene oxide. Xylene and dioxane are examples of suitable inert solvents. The reaction is carried out at moderately elevated temperatures, preferably in the range of from 80 to 110° C. When the ethylene oxide is employed in liquid form, the process is carried out under pressure. If the ethylene oxide is used in the gaseous form the application of pressure can be omitted but a longer reaction interval is required. To shorten the reaction interval, it is generally preferable to carry out the reaction in a pressure vessel. In that case, only a slight excess of ethylene oxide is required. The reaction interval is about 4 to 6 hours.

The mixed ester thus produced is isolated in nearly pure form after distilling off the solvent used, and treated or mixed, for example with benzene and the resultant solution purified by filtration with aluminum oxide.

It was surprising to discover that in carrying out this process, neither polymeric glycol esters are formed, nor does reesterification take place, by the splitting off of the monohydric alcoholic component. A high yield of the desired mixed ester is obtained. It constitutes a valuable starting material for the manufacture of synthetic products.

The following are examples of this invention:

Example 1

100 parts of monomethyl terephthalate (F. P.=218° C.) are dissolved in 1000 parts of dioxane at 50° C. and the mixture introduced into an autoclave following which 100 parts of liquid ethylene oxide are added. The mixture is heated to 100° C. for about 5 hours. Upon cooling the dioxane is distilled off. When the concentrated solution cools, the mixed ester separates out in crystalline form. The mixed ester may be filtered off; dissolved in benzene; and filtered with aluminum oxide.

The mixed ester separates from the concentrated benzene solution in the form of long colorless needles having a melting point of 80°–82° C.

Yield: 91% of the theoretical.

Example 2

100 parts of monomethyl terephthalate are dissolved in 2000 parts of xylene at 50° C.; and the procedure thereafter carried out in the same manner as described in Example 1.

Example 3

100 parts of monoethyl terephthalate are dissolved in 1000 parts of xylene and reacted as described in Example 1. Upon completion of the esterification, the colorless reaction product separates in nearly pure form. Upon recrystallization from benzene the mixed ester is obtained as a colorless crystalline product having a melting point of 59°– 60° C.

Yield: 87% of the theoretical.

We claim:

1. Method of manufacturing esters of terephthalic acid having two different alcoholic components, one of said components being a member of the group consisting of methanol and ethanol and the other component being ethylene glycol, which comprises reacting a monoester of a monohydric alcohol aforesaid and terephthalic acid dissolved in an inert non-aqueous solvent with ethylene oxide at a temperature in the range of about 80° to 110° C.

2. Method in accordance with claim 1 wherein the solvent is xylene.

3. Method in accordance with claim 2 wherein the ethylene oxide is liquid and the reaction is carried out under pressure.

4. Method in accordance with claim 2 wherein the ethylene oxide is in gaseous form.

5. Method in accordance with claim 1 wherein the inert solvent is dioxane.

6. Method in accordance with claim 5 wherein the ethylene oxide is liquid and the reaction is carried out under pressure.

7. Method in accordance with claim 5 wherein the ethylene oxide is in gasous form.

8. Method in accordance with claim 1 wherein the monoester is monomethylterephthalate.

9. Method in accordance with claim 1 wherein the monoester is monoethylterephthalate.

References Cited in the file of this patent

UNITED STATES PATENTS

| | | |
|---|---|---|
| 1,883,182 | Webel | Oct. 18, 1932 |
| 2,335,813 | Stein | Nov. 30, 1943 |
| 2,742,494 | Mraz | Apr. 17, 1956 |